ate Patent [19]

Hill et al.

[11] 4,169,927
[45] Oct. 2, 1979

[54] PROCESS FOR THE POLYMERIZATION OF ETHYLENE

[75] Inventors: Robert W. Hill, Houston; Thomas J. Lynch, Orange; Peter M. Wisneski, Houston, all of Tex.

[73] Assignee: Gulf Oil Corporation, Pittsburgh, Pa.

[21] Appl. No.: 841,869

[22] Filed: Oct. 13, 1977

[51] Int. Cl.$^2$ .......................... C08F 4/02; C08F 10/02
[52] U.S. Cl. .................................. 526/124; 252/430; 526/105; 526/352
[58] Field of Search .................. 252/430, 464; 526/95, 526/124, 129

[56] References Cited

U.S. PATENT DOCUMENTS

| | | | |
|---|---|---|---|
| 2,912,419 | 11/1959 | Peters et al. | 526/95 |
| 3,207,703 | 9/1965 | Innes et al. | 252/464 |
| 3,244,682 | 4/1966 | Czenkusch et al. | 526/95 |
| 3,526,601 | 9/1970 | Fotes et al. | 252/430 |

FOREIGN PATENT DOCUMENTS

| | | | |
|---|---|---|---|
| 783744 | 9/1957 | United Kingdom | 526/95 |
| 959499 | 6/1964 | United Kingdom | 526/129 |
| 1319914 | 6/1973 | United Kingdom | 526/124 |

Primary Examiner—Edward J. Smith
Attorney, Agent, or Firm—Richard L. Kelly

[57] ABSTRACT

A novel process is provided for the polymerization of ethylene in which the polymerization catalyst employed in the process is the reaction product of a vanadium ion-exchanged montmorillonite clay and an organometallic compound of a metal of Group II-A, II-B, or III-A of the Periodic Table.

4 Claims, No Drawings

PROCESS FOR THE POLYMERIZATION OF ETHYLENE

SUMMARY OF THE INVENTION

In accordance with the present invention, the applicants have provided a novel process for the polymerization of ethylene. The process is carried out by contacting the ethylene with a polymerization catalyst which is the reaction product of a vanadium ion-exchanged montmorillonite clay and an organometallic compound of a metal of Group II-A, II-B, or III-A of the Periodic Table.

DETAILED DESCRIPTION OF THE INVENTION

The vanadium ion-exchanged montmorillonite clay used in preparing the polymerization catalysts employed in the present invention is prepared by techniques known in the art. The montmorillonite clay* is slurried in water containing a water soluble vanadium salt such as vanadyl sulfate. This treatment will be continued until the treated clay contains the desired quantity of vanadium incorporated into the structure of the clay. Typically, the ion exchange reaction will be carried out until the dried clay contains at least 3 and preferably at least 5 weight % vanadium. The treated clay then is washed free of occluded ions with distilled water, dried, and preferably calcined at temperatures up to 500° C.

*For description of montmorillonite clays usable in the invention, see Kirk-Othner "Encyclopedia of Chemical Technology," 2nd Edition, John Wiley & Sons, Inc., 1964, Library of Congress Catalog Card 63-14,348, Vol. 5, pages 547–550.

When a montmorillonite clay is ion-exchanged with vanadium, only the surface ions of the cleavage plates of the montmorillonite will readily undergo exchange with a vanadium ion. Thus, in the exchanged product, the vanadium ions are present only on the clay surface and all sites of the vanadium ion are at least 10 A° apart.

The catalysts employed in the invention are prepared by slurrying the vanadium ion-exchanged montmorillonite clay in a liquid hydrocarbon and reacting it with a suitable organometallic compound to reduce the vanadium to a lower valence state. The organometallic compound employed will be an organo compound of a metal of Group II-A, II-B, or III-B of the Periodic Table. Examples of organometallic compounds suitable for use in reducing vanadium compounds are widely reported in the art. See U.S. Pat. No. 3,219,648 whose description is incorporated herein by reference. The preferred organometallic compounds are aluminum alkyls of the type employed in the preparation of Ziegler-type catalysts, such as a dialkyl aluminum hydride, a dialkyl aluminum halide, or a trialkyl aluminum; particularly triethyl aluminum or triisobutyl aluminum. The two components are employed in proportions to provide an Al/V atomic ratio of about 0.5–10.0 and preferably 1.0–5.0.

By reason of the unique structure of the vanadium ion-exchanged montmorillonite clay employed in their preparation, the polymerization catalysts of the invention have unique properties making them particularly well suited for use in the polymerization of ethylene. As all of the vanadium ions are present on the clay surface and are at least 10 A° apart, very efficient use is made of the vanadium component in the catalyst. For this reason, the ethylene polymer produced will have a low transition metal content. In addition, for reasons not fully understood, the ethylene polymers produced by the invention have an unusually narrow molecular weight distribution as measured by its $M_w/M_n$ ratio.

The polymerization of ethylene can be effected by contacting ethylene with the polymerization catalyst in the liquid or gaseous phase, and in the presence or absence of an inert hydrocarbon solvent such as benzene, xylene, isooctane, n-decane, n-hexane, n-heptane, pentane, cyclohexane, and the like. The concentration of the polymerization catalyst in the polymerization zone is maintained in the range of 0.01 to 4.0 g. per liter of reactor volume. The polymerization reaction is generally conducted at a temperature of about 0°–250° C. and preferably 50°–110° C. at modest pressures somewhat above atmospheric pressure, e.g., at 5 atmospheres or above.

The polymerization process can be carried out batchwise, or by continuous polymerization methods known in the art. The polymerization can be conducted in the absence or presence of hydrogen and other polymerization additives and/or modifiers known in the art, such as amines, ethers or dicumyl peroxide.

The ethylene polymer produced can be separated from the polymerization mixture by conventional polymer separation steps known in the art. If desired, although not normally required because of high productivity of the process, inorganic polymerization catalyst residues can be separated from the polymer product by methods known in the art. One method comprises stirring a slurry of the polymerization product in water or an alcohol, such as methanol, and then separating the ethylene polymer by filtration to provide a white product.

The following examples are set forth to illustrate the principle and practice of the invention. Where parts or percentages are mentioned, they are parts or percentages by weight unless otherwise noted.

EXAMPLE 1

Part A

A suitable stirred reactor is charged with 1100 ml of distilled water, 15 gms of montmorillonite clay (Barasym-100) and 32 gms. of vanadyl sulfate monohydrate. The slurry is stirred for 16 hours at ambient temperature and the clay then is recovered by filtration. The treated clay is reslurried in another 1100 ml of distilled water containing another 32 gms. of vanadyl sulfate monohydrate and stirred for an additional 16-hour period. This treatment is repeated two more times. The treated clay is recovered by removing the water on a rotary evaporator operating at 100° C. under a reduced pressure of 3 mm of Hg. The treated clay then is calcined for 8 hours at 500° C. The product is bright yellow in color and contains 6.6 weight % vanadium.

Part B

The vanadium ion-exchanged montmorillonite clay prepared in Part A is charged to a stirred polymerization reaction vessel in the amount of 0.8 gm. The reaction vessel is maintained in a heated jacket maintained at a temperature about 110° C. A small quantity of dry, oxygen-free isobutane then is charged to the reactor, allowed to vaporize, and vented from the reactor to remove all traces of oxygen from the reactor. The reactor then is charged with 500 parts of isobutane and 0.18 gm. of diethyl aluminum chloride dissolved in hexane as a 20 weight % solution. The reactor then is attached to a reservoir of polymerization grade ethylene gas maintained at a pressure of 3.5 megapascals (approximately 35 atmospheres). The reactor is maintained in continuous, open communication with a reservoir of ethylene gas with a flow meter being maintained in the ethylene line to measure the flow of gas to the reactor. The reaction is run for a period of 90 minutes and approximately 75 gms. of ethylene polymer is recovered. The polyethylene has a weight average molecular weight of approximtely 900,000 and an extremely narrow molecular weight distribution as its $M_w/M_n$ ratio is 2.7.

What is claimed:

1. A process for the polymerization of ethylene which consists essentially of contacting ethylene with a polymerization catalyst which is the reaction product of a vanadium ion-exchanged montmorillonite clay and an organometallic compound of a metal of Group II-A, II-B, or III-A of the Periodic Table; said vandium ion-exchanged montmorillonite clay having been prepared by treating a montmorillonite clay with an aqueous solution of vanadyl sulfate until said clay has incorporated therein, by ion-exchange, at least 3 weight % of vanadium (on a dry weight basis), washing said clay free of occluded ions, and drying said vanadium ion-exchanged clay.

2. The process of claim 1 in which the organometallic compound is an aluminum alkyl.

3. A polymerization catalyst consisting essentially of the reaction product of a vanadium ion-exchanged montmorillonite clay and an aluminum alkyl; said vanadium ion-exchanged montmorillonite clay having been prepared by treating a montmorillonite clay with an aqueous solution of vanadyl sulfate until said clay has incorporated therein, by ion-exchange, at least 3 weight % of vanadium (on a dry weight basis), washing said clay free of occluded ions, and drying said vanadium ion-exchanged clay.

4. A polymerization catalyst of claim 3 in which the aluminum alkyl is diethyl aluminum chloride.

* * * * *